United States Patent
Horikawa et al.

(10) Patent No.: US 12,084,546 B2
(45) Date of Patent: Sep. 10, 2024

(54) THERMOSETTING RESIN COMPOSITION, FILM ADHESIVE, PREPREG, AND PRODUCTION METHOD THEREOF

(71) Applicant: TEIJIN LIMITED, Osaka (JP)

(72) Inventors: Miki Horikawa, Osaka (JP); Takaya Suzuki, Osaka (JP); Hiroaki Kuwahara, Osaka (JP)

(73) Assignee: TEIJIN LIMITED, Osaka (JP)

( * ) Notice: Subject to any disclaimer, the term of this patent is extended or adjusted under 35 U.S.C. 154(b) by 637 days.

(21) Appl. No.: 17/298,305

(22) PCT Filed: Nov. 26, 2019

(86) PCT No.: PCT/JP2019/046183
§ 371 (c)(1),
(2) Date: May 28, 2021

(87) PCT Pub. No.: WO2020/111065
PCT Pub. Date: Jun. 4, 2020

(65) Prior Publication Data
US 2022/0017698 A1   Jan. 20, 2022

(30) Foreign Application Priority Data
Nov. 29, 2018 (JP) .................. 2018-224300

(51) Int. Cl.
| | | |
|---|---|---|
| C08G 73/12 | (2006.01) | |
| C08J 5/24 | (2006.01) | |
| C08L 79/08 | (2006.01) | |
| C09J 7/10 | (2018.01) | |
| C09J 7/38 | (2018.01) | |

(52) U.S. Cl.
CPC ............ *C08G 73/128* (2013.01); *C08J 5/243* (2021.05); *C08J 5/244* (2021.05); *C08J 5/249* (2021.05); *C08L 79/085* (2013.01); *C09J 7/10* (2018.01); *C09J 7/38* (2018.01); *C08J 2379/08* (2013.01); *C09J 2400/12* (2013.01); *C09J 2479/08* (2013.01)

(58) Field of Classification Search
CPC combination set(s) only.
See application file for complete search history.

(56) References Cited

U.S. PATENT DOCUMENTS

| | | | |
|---|---|---|---|
| 4,526,835 A | 7/1985 | Takahashi et al. | |
| 2010/0143728 A1* | 6/2010 | Tsuchikawa | H05K 1/0373 428/457 |

FOREIGN PATENT DOCUMENTS

| | | |
|---|---|---|
| EP | 2 955 248 A1 | 12/2015 |
| JP | 54-039495 A | 3/1979 |
| JP | 56-55427 A | 5/1981 |
| JP | 2009-105283 A | 5/2009 |
| JP | 2009-149742 A | 7/2009 |
| JP | 2014-047353 A | 3/2014 |
| JP | 2016-524629 A | 8/2016 |
| WO | 2014/176006 A1 | 10/2014 |

OTHER PUBLICATIONS

International Search Report of PCT/JP2019/046183 dated Feb. 25, 2020 [PCT/ISA/210].

* cited by examiner

*Primary Examiner* — Robert T Butcher
(74) *Attorney, Agent, or Firm* — Sughrue Mion, PLLC

(57) ABSTRACT

The present invention provides a thermosetting resin composition characterized by comprising a bismaleimide compound and a triazine compound having a diaminotriazine structure.

15 Claims, No Drawings

THERMOSETTING RESIN COMPOSITION, FILM ADHESIVE, PREPREG, AND PRODUCTION METHOD THEREOF

CROSS REFERENCE TO RELATED APPLICATIONS

This application is a National Stage of International Application No. PCT/JP2019/046183, filed Nov. 26, 2019, claiming priority to Japanese Patent Application No. 2018-224300, filed Nov. 29, 2018.

TECHNICAL FIELD

The present invention relates to a thermosetting resin composition, a film adhesive containing the thermosetting resin composition, a prepreg, and production methods thereof. More specifically, the present invention relates to a thermosetting resin composition having excellent adhesiveness to a metal, a film adhesive containing the thermosetting resin composition, a prepreg containing the thermosetting resin composition, and production methods thereof.

BACKGROUND ART

Thermosetting resin compositions and film adhesives containing the thermosetting resin compositions are widely used as various adhesives. However, in applications where high strength is required, such as aircraft structural members, when a fiber-reinforced composite material and a metal material are adhered to each other using a film adhesive, sufficient adhesive strength may not be obtained. Therefore, a method of increasing the adhesive strength by surface-treating the metal material is generally adopted. However, the surface treatment of the metal material requires a complicated operation before the adhesion process, and there is a problem that it takes time and effort. Further, a halogen compound containing an element such as chlorine is generally used for the surface treatment of the metal material. Halogen compounds are classified as environmentally and toxicologically unfavorable harmful substances (toxicity, sensitization and carcinogenicity), and there is concern about their influence on the environment.

Patent Literature 1 describes a surface treatment method for a metal material, which does not use an adhesive bonding primer in order to facilitate adhesion. Further, Patent Literature 2 describes a surface treatment method for a metal material, which does not use a halogen compound. However, these methods require the formation of a chemical conversion layer through surface treatment, and still require a complicated operation.

CITATION LIST

Patent Literature

Patent Literature 1: JP 2016-524629 A
Patent Literature 2: JP 2014-047353 A

SUMMARY OF INVENTION

Technical Problem

An object of the present invention is to provide a thermosetting resin composition having excellent adhesiveness to a metal material regardless of the presence or absence of surface treatment of the metal material. Another object of the present invention is to provide a film-shaped adhesive or prepreg formed by using this thermosetting resin composition, and production methods thereof.

Solution to Problem

The present inventors have found that a thermosetting resin composition containing a bismaleimide compound and a triazine compound having a predetermined structure can solve the above-described problems, and have completed the present invention.

The present invention that solves the above problems is as described below.

[1] A thermosetting resin composition containing a bismaleimide compound and a triazine compound having a diaminotriazine structure.

[2] The thermosetting resin composition according to [1], wherein the thermosetting resin composition contains 0.1 to 30 parts by mass of the triazine compound based on 100 parts by mass of the bismaleimide compound.

[3] The thermosetting resin composition according to [1] or [2], wherein the thermosetting resin composition further contains a thermoplastic resin.

The inventions according to [1] to [3] are directed to a thermosetting resin composition containing a bismaleimide compound and a triazine compound having a predetermined structure. This thermosetting resin composition is also used as a material for the film adhesive according to [4] below and the prepreg according to [11] below.

[4] A film adhesive containing: a base material fiber; and a thermosetting resin composition,
the thermosetting resin composition containing: a bismaleimide compound; and a triazine compound having a diaminotriazine structure.

[5] The film adhesive according to [4], wherein the thermosetting resin composition contains 0.1 to 30 parts by mass of the triazine compound based on 100 parts by mass of the bismaleimide compound.

[6] The film adhesive according to [4] or [5], wherein the thermosetting resin composition further contains a thermoplastic resin.

[7] The film adhesive according to any one of [4] to [6], wherein the base material fiber is a glass fiber or a carbon fiber.

[8] The film adhesive according to any one of [4] to [7], which has a areal weight of 50 to 1500 g/mW.

The inventions according to [4] to [8] are directed to a film-shaped adhesive in which the thermosetting resin composition according to [1] is supported by a base material fiber.

[9] A method for producing the film adhesive according to [4], including integrating the base material fiber and the thermosetting resin composition.

[10] The method for producing the film adhesive according to [9], wherein the integration is impregnation of the thermosetting resin composition into the base material fiber.

[11] A prepreg containing: a reinforcing fiber; and a thermosetting resin composition impregnated into a reinforcing fiber layer made of the reinforcing fiber,
the thermosetting resin composition containing: a bismaleimide compound and a triazine compound having a diaminotriazine structure.

[12] The prepreg according to [11], wherein the thermosetting resin composition contains 0.1 to 30 parts by mass of the triazine compound based on 100 parts by mass of the bismaleimide compound.

[13] The prepreg according to [11] or [12], wherein the thermosetting resin composition further comprises a thermoplastic resin.

[14] The prepreg according to any one of [11] to [13], wherein the reinforcing fiber is a carbon fiber.

The inventions according to [11] to [14] are directed to a prepreg in which the thermosetting resin composition according to [1] is impregnated into the reinforcing fiber.

[15] A method for producing a prepreg, including integrating a reinforcing fiber and the thermosetting resin composition according to any one of [1] to [3].

Advantageous Effects of Invention

The thermosetting resin composition of the present invention and the film adhesive containing the same have, particularly, high adhesiveness to metals.

DESCRIPTION OF EMBODIMENTS

Hereinafter, the thermosetting resin composition, the film adhesive, the prepreg, and the production methods thereof according to the present invention will be described in detail.

(1) Thermosetting Resin Composition

The thermosetting resin composition of the present invention contains a bismaleimide compound and a triazine compound having a diaminotriazine structure. This triazine compound dissolves in the bismaleimide compound during a curing reaction, and the $NH_2$ group of the triazine ring form a coordination bond with the metal to improve the adhesiveness to the metal material.

(1-1) Bismaleimide Compound

As the bismaleimide compound (hereinafter, also referred to as "BMI") blended in the present thermosetting resin composition, a conventionally known bismaleimide compound can be used. For example, a bismaleimide compound represented by the following chemical formula (1) can be mentioned.

[Chemical Formula 1]

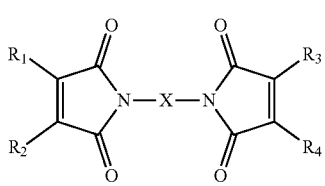

Chemical Formula (1)

In chemical formula (1), $R_1$ to $R_4$ each independently represent a group selected from the group consisting of —H, —$CH_3$, —$C_2H_5$, —$C_3H_7$, —F, —Cl, —Br and —I. X will be described later.

In the present invention, the bismaleimide compound may be either an aromatic bismaleimide or an aliphatic bismaleimide. In the present invention, the amount of aromatic bismaleimide with respect to the entire bismaleimide compound contained in the thermosetting resin composition is preferably 70% by mass or more. Further, in the present invention, the total amount of the bismaleimide compound with respect to the total amount of the thermosetting resin composition is preferably 10% by mass or more, more preferably 20% by mass or more, particularly preferably 30% by mass or more.

(1-1-1) Aromatic Bismaleimide Compound

When the bismaleimide compound contains an aromatic ring structure (hereinafter, also referred to as "aromatic bismaleimide compound"), X in chemical formula (1) is preferably a structure described in the following chemical formulas (2) to (8).

[Chemical Formula 2]

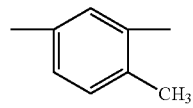

Chemical Formula (2)

[Chemical Formula 3]

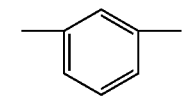

Chemical Formula (3)

[Chemical Formula 4]

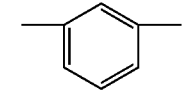

Chemical Formula (4)

[Chemical Formula 5]

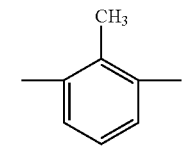

Chemical Formula (5)

In chemical formula (5), $R_5$ represents —$CH_2$—, —$C(CH_3)_2$—, —O—, or —$SO_2$—.

[Chemical Formula 6]

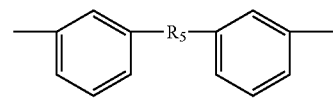

Chemical Formula (6)

In chemical formula (6), $R_5$ represents —$CH_2$—, —$C(CH_3)_2$—, —O—, or —$SO_2$—. In addition, $R_6$ to $R_9$ each independently represent a group selected from the group consisting of —H, —$CH_3$, —$C_2H_5$, —$C_3H_7$, —F, —Cl, —Br and —I.

[Chemical Formula 7]

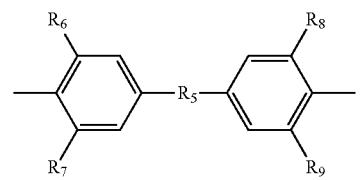

Chemical Formula (7)

In chemical formula (7), $R_5$ represents —$CH_2$—, —$C(CH_3)_2$—, —O—, or —$SO_2$—.

[Chemical Formula 8]

Chemical Formula (8)

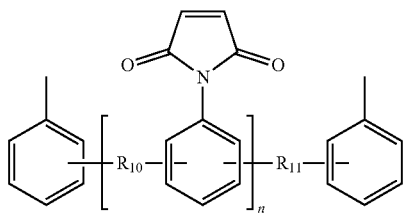

In chemical formula (8), $R_{10}$ to $R_{11}$ each independently represent —$CH_2$—, —$C(CH_3)_2$—, —O—, or —$SO_2$—. In chemical formula (8), n is 0 to 0.5.

Examples of such aromatic bismaleimide compounds can include N,N'-4,4'-diphenylmethane bismaleimide, N,N'-4,4'-diphenyl ether bismaleimide, and N, N'-r-phenylene bismaleimide. N, N'-p-phenylene bismaleimide, N, N'-m-toluylene bismaleimide, N,N'-4,4'-biphenylene bismaleimide, N,N'-4,4'-(3,3'-dimethylbiphenylene) bismaleimide, 2,2-bis[4-(4-maleimidephenoxy)phenyl]propane, 3,3'-dimethyl-5,5'-diethyl-4,4'-diphenylmethane bismaleimide, 4-methyl-1,3-phenylene bismaleimide, N,N'-4,4'-diphenylsulphone bismaleimide, and N,N'-4,4'-benzophenone bismaleimide.

From the viewpoint of heat resistance after heat curing, N,N'-4,4'-diphenylmethane bismaleimide, N,N'-4,4'-diphenyl ether bismaleimide, N,N'-m-toluylene bismaleimide, 2,2-bis[4-(4-maleimidephenoxy)phenyl]propane, 4-methyl-1,3-phenylenebismaleimide, N,N'-4,4'-diphenylsulphonbismaleimide, and N,N'-4,4'-benzophenone bismaleimide are preferred, and N,N'-4,4'-diphenylmethane bismaleimide, N,N'-4,4'-diphenyl ether bismaleimide, N,N'-m-toluylene bismaleimide, 2,2-bis[4-(4-maleimidephenoxy)phenyl]propane, and 4-methyl-1,3-phenylene bismaleimide are particularly preferred. These aromatic bismaleimide compounds may be used alone, or two or more thereof may be used in combination.

The content of the aromatic bismaleimide compound in the present thermosetting resin composition is preferably 10 to 80% by mass, more preferably 20 to 65% by mass, particularly preferably 25 to 60 by mass, based on the total mass of the present thermosetting resin composition. When the content of the aromatic bismaleimide compound is less than 10% by mass, the heat resistance of the film adhesive prepared by using the present thermosetting resin composition tends to be low. When the content of the aromatic bismaleimide compound exceeds 80% by mass, the handleability of the film adhesive prepared by using the present thermosetting resin composition tends to be low.

(1-1-2) Aliphatic Bismaleimide Compound

When the bismaleimide compound does not contain an aromatic ring structure (hereinafter, also referred to as "aliphatic bismaleimide compound"), X in chemical formula (1) is preferably a structure described in the following chemical formulas (9) to (11).

[Chemical Formula 9]

Chemical Formula (9)

In chemical formula (9), n is an integer of 10 or less, preferably 1, 2, 3, 4, or 6.

[Chemical Formula 10]

Chemical Formula (10)

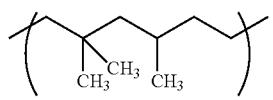

[Chemical Formula 11]

Chemical Formula (11)

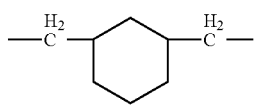

Examples of such aliphatic bismaleimide compounds can include 1,6'-bismaleimide-(2,2,4-trimethyl)hexane, hexamethylenediamine bismaleimide, N,N'-1,2-ethylene bismaleimide, N,N'-1,3-propylene bismaleimide, and N,N'-1,4-tetramethylene bismaleimide. 1,6'-Bismaleimide-(2,2,4-trimethyl)hexane and hexamethylenediamine bismaleimide are particularly preferred. The aliphatic bismaleimide compounds may be used alone, or two or more thereof may be used in combination.

The content of the aliphatic bismaleimide compound in the present thermosetting resin composition is preferably 3 to 30% by mass, preferably 5 to 20% by mass, particularly preferably 7 to 15% by mass, based on the total mass of the present thermosetting resin composition. When the amount of the aliphatic bismaleimide compound blended is less than 3% by mass, the handleability of the film adhesive prepared by using the present thermosetting resin composition tends to decrease. When the content of the aliphatic bismaleimide compound exceeds 30% by mass, the heat resistance of the cured product of the present thermosetting resin composition tends to decrease.

(1-2) Triazine Compound

The triazine compound used in the present invention is a triazine compound having a diaminotriazine structure. For example, triazine compounds represented by the following chemical formulas (12) to (14) can be mentioned.

[Chemical Formula 12]

Chemical Formula (12)

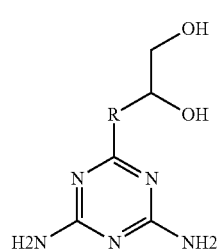

In chemical formula (12), R is preferably an aliphatic chain having 1 to 15 carbon atoms.

[Chemical Formula 13]

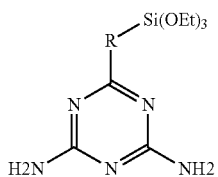

Chemical Formula (13)

In chemical formula (13), R is preferably an aliphatic chain having 1 to 15 carbon atoms.

[Chemical Formula 14]

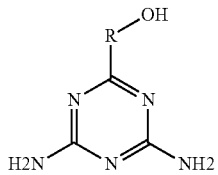

Chemical Formula (14)

In chemical formula (14), R is preferably an aliphatic chain having 1 to 15 carbon atoms.

In the present invention, as the triazine compound having a diaminotriazine structure, a compound having an OH group is preferable, and a compound having two or more OH groups is preferable. The compound having an OH group can further enhance the adhesiveness between the metal and the resin, since the OH group contributes to the adhesiveness to the resin in addition to the adhesiveness to the metal.

Further, in the present invention, the triazine compound having a diaminotriazine structure preferably has a melting point of 100° C. or higher. The triazine compound having a diaminotriazine structure, which has a melting point of 100° C. or higher, is particularly preferable as a film adhesive for honeycomb sandwich panels because of its excellent fillet forming properties. The fillet is a resin pool formed at an end part of the honeycomb due to a decrease in viscosity of the resin at the same time as the temperature rises during molding. The formation of the fillet increase the adhesive area, and improves the adhesiveness between the honeycomb and the skin material.

The content of the triazine compound in the present thermosetting resin composition is preferably 0.1 to 30 parts by mass, more preferably 1 to 20 parts by mass, particularly preferably 1 to 10 parts by mass, based on 100 parts by mass of the bismaleimide compound contained in the present thermosetting resin composition. If it is less than 0.1 parts by mass, the adhesiveness to the metal material tends to decrease.

In the present thermosetting resin composition, the triazine compound may be dispersed in the bismaleimide compound, or may be partially or entirely dissolved in the bismaleimide compound. The undissolved triazine compound dissolves in the bismaleimide compound upon heating during the curing reaction.

(1-3) Co-Reactant

The thermosetting resin composition of the present invention preferably contains a co-reactant. The co-reactant is preferably liquid at room temperature. Examples of such co-reactants include alkenylphenols and/or alkenylphenol ethers.

The alkenylphenol ether is obtained by reacting a phenolic compound with an alkenyl halide. Alkenylphenol can be obtained by Claisen rearrangement of alkenylphenol ether (JP S52-994 A). The alkenylphenol and/or the alkenylphenol ether compound may contain a transition structure thereof.

As the alkenylphenol and/or alkenylphenol ether, allylphenol, metallylphenol or their ethers are preferable. In particular, compounds having the following chemical formulas (15) to (19) are preferable.

[Chemical Formula 15]

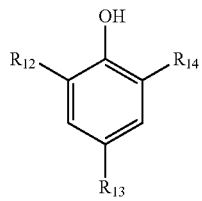

Chemical Formula (15)

In chemical formula (15), $R_{12}$, $R_{13}$ and $R_{14}$ are each independently hydrogen or an alkenyl group having 2 to 10 carbon atoms, preferably an allyl group or a propenyl group. Provided that at least one of $R_{12}$, $R_{13}$, and $R_{14}$ is an alkenyl group having 2 to 10 carbon atoms.

[Chemical Formula 16]

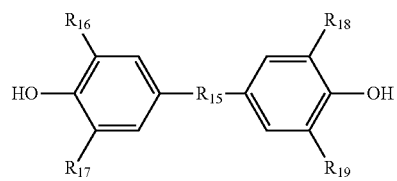

Chemical Formula (16)

In chemical formula (16), $R_{15}$ is a direct bond, —$CH_2$—, —$C(CH_3)_2$—, —O—, —S—, —SO—, or —$SO_2$—. $R_{16}$, $R_{17}$, $R_{18}$ and $R_{19}$ are each independently hydrogen or an alkenyl group having 2 to 10 carbon atoms, preferably an allyl group or a propenyl group. Provided that at least one of $R_{16}$, $R_{17}$, $R_{18}$, and $R_{19}$ is an alkenyl group having 2 to 10 carbon atoms.

Among chemical formulas (16), a compound of the following chemical formula (17) is particularly preferable.

[Chemical Formula 17]

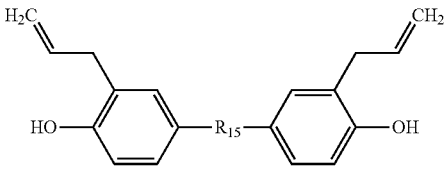

Chemical Formula (17)

In chemical formula (17), $R_{15}$ represents a direct bond, —$CH_2$—, —$C(CH_3)_2$—, —O—, —S—, —SO—, or —$SO_2$—.

[Chemical Formula 18]

Chemical Formula (18)

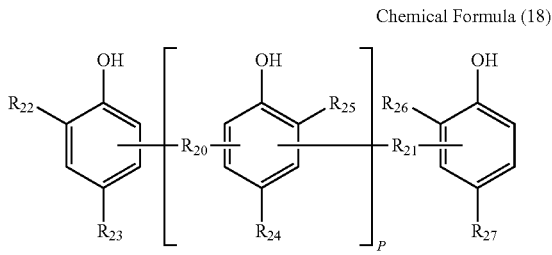

In chemical formula (18), $R_{20}$ and $R_{21}$ are direct bonds, —$CH_2$—, —$C(CH_3)_2$—, —O—, —S—, —SO—, or —$SO_2$—. $R_{22}$, $R_{23}$, $R_{24}$, $R_{25}$, $R_{26}$, and $R_{27}$ are each independently hydrogen, an alkyl group having 1 to 4 carbon atoms, or an alkenyl group having 2 to 10 carbon atoms, preferably an allyl group or a propenyl group. Provided that at least one of $R_{22}$, $R_{23}$, $R_{24}$, $R_{25}$, $R_{26}$, and $R_{27}$ is an alkenyl group having 2 to 10 carbon atoms. P is an integer from 0 to 10.

[Chemical Formula 19]

Chemical Formula (19)

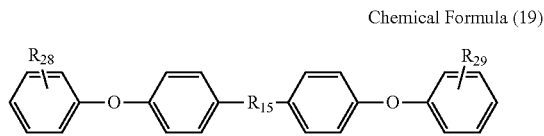

In chemical formula (19), $R_{15}$ represents a direct bond, —$CH_2$—, —$C(CH_3)_2$—, —O—, —S—, —SO—, or —$SO_2$—. $R_{28}$ and $R_{29}$ are each independently hydrogen, an alkyl group having 1 to 4 carbon atoms, or an alkenyl group having 2 to 10 carbon atoms, preferably an allyl group or a propenyl group. Provided that at least one of $R_{28}$ and $R_{29}$ is an alkenyl group having 2 to 10 carbon atoms.

Examples of such alkenylphenols or alkenylphenol ether compounds can include O,O'-diallyl bisphenol A, 4,4'-dihydroxy-3,3'-diallyldiphenyl, bis(4-hydroxy-3-allylphenyl) methane, 2,2'-bis(4-hydroxy-3,5-diallylphenyl)propane, 2,2'-diallyl bisphenol F, 4,4'-dihydroxy-3,3'-dialyldiphenyl ether, and 4,4'-bis-O-propenylphenoxy-benzophenone. Among these, 0,0'-diallyl bisphenol A, 2,2'-bis(4-hydroxy-3,5-diallylphenyl) propane, 2,2'-diallyl bisphenol F and the like are preferable because of a high glass transition point after heat curing. O,O'-diallyl bisphenol A is particularly preferable because it lowers the viscosity of the resin composition. In the present thermosetting resin composition, alkenylphenols and/or alkenylphenol ethers may be used alone, or two or more thereof may be used in combination.

The alkenylphenol and/or the alkenylphenol ether compound functions as a curing agent for the bismaleimide compound. The amount of the alkenylphenol and/or the alkenylphenol ether compound blended in the present thermosetting resin composition is preferably 5 to 70% by mass, more preferably 10 to 50% by mass, particularly preferably 15 to 40% by mass. The present thermosetting resin composition appropriately contains an alkenylphenol and/or an alkenylphenol ether compound within the above-described predetermined range so that the viscosity can be adjusted and that good handleability can be obtained. The content of the alkenylphenol and/or alkenylphenol ether compound in the present thermosetting resin composition is preferably 10 to 400 parts by mass, more preferably 25 to 250 parts by mass, particularly preferably 40 to 150 parts by mass, based on 100 parts by mass of the bismaleimide compound contained in the present thermosetting resin composition. The blending amount proportion of the alkenylphenol and/or the alkenylphenol ether compound to the bismaleimide compound is set in this range, so that a thermosetting resin composition having excellent handleability and providing excellent mechanical properties of the cured product can be obtained.

(1-4) Thermoplastic Resin

The present resin composition preferably contains a thermoplastic resin. As the thermoplastic resin, a known thermoplastic resin can be used.

Examples of the thermoplastic resin include polyethersulfone, polysulfone, polyetherimide, and polyimide.

When the thermoplastic resin is blended, the content thereof is preferably 0.1 to 40% by mass, more preferably 0.1 to 30% by mass, particularly preferably 1 to 20l by mass. If the content of the thermoplastic resin is less than 0.1% by mass, the viscosity of the resin composition may not sufficiently increase, so that the adhesiveness may be insufficient. If the content of the thermoplastic resin is too high, the viscosity of the resin composition may increase, and the handleability may be significantly deteriorated.

Both a thermoplastic resin soluble in the thermosetting resin composition of the present invention (hereinafter, also referred to as "soluble thermoplastic resin") and a thermoplastic resin insoluble therein (hereinafter, also referred to as "insoluble thermoplastic resin") can be used.

(1-4-1) Soluble Thermoplastic Resin

In the present invention, the soluble thermoplastic resin means a thermoplastic resin, a part or all of which is dissolved in the thermosetting resin composition at 180° C. The soluble thermoplastic resin dissolves in the thermosetting resin composition and increases the viscosity of the thermosetting resin composition.

Examples of the soluble thermoplastic resin include polyethersulfone, polysulfone, polyetherimide, and polyimide.

When the soluble thermoplastic resin is blended, the content thereof is preferably 0.1 to 40% by mass, more preferably 1 to 30% by mass. If the content of the soluble thermoplastic resin is less than 0.1% by mass, the viscosity of the thermosetting resin composition does not increase sufficiently, which may lead to the outflow of the thermosetting resin composition. If the content of the soluble thermoplastic resin is too high, the viscosity of the thermosetting resin composition becomes high, and the handleability may be significantly deteriorated.

(1-4-2) Insoluble Thermoplastic Resin

In the present invention, the insoluble thermoplastic resin refers to a thermoplastic resin that does not dissolve in the thermosetting resin composition at 180° C. Examples of the insoluble thermoplastic resin can include a polyimide resin.

When the insoluble thermoplastic resin is blended, the content thereof is preferably 0.1 to 40% by mass, more preferably 1 to 20% by mass. The insoluble thermoplastic resin is contained in an amount in this range, so that the impact resistance of the cured product of the thermosetting resin composition can be improved. If the content of the insoluble thermoplastic resin is less than 0.1% by mass, the viscosity of the thermosetting resin composition does not increase sufficiently, which may lead to the outflow of the thermosetting resin composition. If the content of the insoluble thermoplastic resin is too high, the viscosity of the thermosetting resin composition may increase, and the handleability may be significantly deteriorated. The particle size of the insoluble thermoplastic resin is not particularly limited, but is preferably 0.1 to 100 μm, more preferably 1 to 50 μm.

(1-5) Other Components

The present thermosetting resin composition may contain other components as long as the adhesiveness is not impaired. Examples of other components include polymerization inhibitors, conductive particles, conductive fillers, inorganic fillers, rubber-like components, toughness-imparting agents, stabilizers, mold release agents, and colorants.

(2) Method for Producing Thermosetting Resin Composition

In order to produce the present thermosetting resin composition, the above-described components may be mixed to obtain a uniformly dissolved and/or dispersed composition, and the method therefor is not particularly limited. Although these components may be mixed at ordinary temperature, it is preferable to heat and mix them for economic production. In this case, the heating temperature is usually 30 to 150° C., preferably 50 to 120° C. At temperatures above 150° C., the polymerization reaction is accelerated so that the present thermosetting resin composition may cure during mixing.

Mixing may be performed in one stage or in multiple stages. The mixing order of the respective components of the resin composition is not limited, but the component to be blended as the solid phase component is preferably added after the other components in the resin composition are dissolved. This facilitates uniform dispersion of the solid phase component in the resin composition. The mixing time varies depending on the temperature, but is preferably 10 to 180 minutes.

As the kneading machine device, conventionally known devices such as a roll mill, a planetary mixer, a kneader, an extruder, and a Banbury mixer can be used.

(3) Film Adhesive

The film adhesive of the present invention contains the above-described thermosetting resin composition supported on a base material fiber. The thermosetting resin composition is preferably impregnated into the base material fiber. The areal weight of the film adhesive is preferably 50 to 1500 g/m², more preferably 100 to 500 g/m².

Examples of the base material fiber used in the present film adhesive can include carbon fibers, glass fibers, aramid fibers, silicon carbide fibers, polyester fibers, ceramic fibers, alumina fibers, boron fibers, metal fibers, mineral fibers, rock fibers, and slug fibers. Among these, carbon fibers, glass fibers, and aramid fibers are preferable, and glass fibers are more preferable.

The shape of the base material fiber is not limited, but a sheet-shaped material is preferable from the viewpoint of processability. Examples of the sheet-shaped base material can include sheet-shaped materials in which a large number of fibers are aligned in unidirection, bidirectional woven fabrics such as plain weave and twill weave, multi-axis woven fabrics, non-woven fabrics, mats, knits, braids, and papers made from reinforcing fibers. The thickness of the base material fiber sheet is preferably 0.01 to 0.5 mm, more preferably 0.02 to 0.15 mm. The areal weight of the base material fiber sheet is preferably 10 to 400 g/mW, more preferably 20 to 150 g/m².

The content of the present thermosetting resin composition in the film adhesive is preferably 20 to 95%: by mass, more preferably 30 to 70% by mass. If it is less than 20% by mass, the present thermosetting resin composition is impregnated into the base material fiber (that is, since the present thermosetting resin composition stays in the base material fiber layer so that the amount of the present thermosetting resin composition existing on the surface of the base material fiber layer which comes into contact with the adherend may be reduced), the film adhesive may be difficult to function as an adhesive. If it exceeds 95% by mass, the base material fiber may not be able to sufficiently support the present thermosetting resin composition.

The adhesive bonding strength of the film adhesive of the present invention is preferably 2.5 MPa or more, more preferably 3.0 MPa or more, particularly preferably 3.5 MPa or more in a flatwise tensile test, as measured in the Examples which will be described later. Further, the lap shear tensile strength as measured in the Examples which will be described later is preferably 10 MPa or more, more preferably 13 MPa or more.

(4) Method for Producing Film Adhesive

The film adhesive of the present invention can be produced by integrating the present thermosetting resin composition and the base material fiber. As a method for integrating the present thermosetting resin composition with the base material fiber, a known wet impregnation method or dry impregnation method can be used. Since the wet impregnation method uses an organic solvent, it is necessary to remove an organic solvent after impregnation of the resin composition. Therefore, it is preferable to use the hot melt method, which is a dry method in which there is no possibility that the organic solvent remains.

The hot melt method is a method in which the resin composition is stacked on the base material fiber and heated under pressurization to reduce the viscosity of the resin composition and impregnate the resin composition into the base material fiber. When the base material fiber is a sheet-shaped material, it is preferable to stack the resin composition molded into a film on the base material fiber.

The present thermosetting resin composition can be molded into a film by a known method. For example, the present thermosetting resin composition can be molded into a film by casting it on a support such as a release paper or a release film using a die coater, an applicator, a reverse roll coater, a comma coater, a knife coater, or the like. The temperature at which the film is produced is appropriately set according to the viscosity of the present thermosetting resin composition. Generally, the temperature is preferably 50 to 130° C., more preferably 80 to 110° C.

The thickness of the film of the present thermosetting resin composition is preferably generally 8 to 500 μm, more preferably 10 to 300 μm.

The pressurizing conditions when the present thermosetting resin composition is impregnated into the base material fiber are appropriately adjusted according to the composition and viscosity of the present thermosetting resin composition. Pressurization does not have to be performed. At the time of pressurization, the linear pressure is usually 245 N/cm or less, more preferably 147 N/cm or less. Pressurization may be performed once or may be divided into a plurality of times.

The heating temperature when the present thermosetting resin composition is impregnated into the base material fiber is appropriately adjusted according to the viscosity of the present thermosetting resin composition. It is usually 25° C. or higher, preferably 30° C. or higher. The upper limit of the heating temperature is preferably 160° C. or lower, more preferably 150° C. or lower, particularly preferably 140° C. or lower. If the heating temperature is less than 25° C., the viscosity of the present thermosetting resin composition does not decrease, and the present thermosetting resin composition cannot be sufficiently impregnated into the base material fiber. If the heating temperature exceeds 150° C., the curing reaction of the present thermosetting resin composition tends to proceed.

(5) Method of Using Film Adhesive

The film adhesive of the present invention is used by arranging it at an adhesion interface and curing it by a known method. In particular, it is preferably used when adhering fiber-reinforced composite materials to each other or when adhering a fiber-reinforced composite material and a metal material to each other. It can also be used by being stacked on a prepreg for preparing a fiber-reinforced composite material. That is, it is also possible to adhere a fiber-reinforced composite material to an object to be adhered (another fiber-reinforced composite material or a metal material), while the fiber-reinforced composite material is prepared.

Since the film adhesive of the present invention is supported on the base material fiber, it has excellent adhesiveness to a honeycomb core or the like. That is, a part of the present thermosetting resin composition supported on the base material fiber penetrates along the wall surface of the honeycomb core, and a fillet is easily formed on the wall surface portion of the honeycomb core. In particular, it has excellent adhesiveness to a metal honeycomb core.

(6) Prepreg

The prepreg of the present invention (hereinafter, also referred to as "the present prepreg") is a prepreg in which the present thermosetting resin composition described above is impregnated into a reinforcing fiber base material.

Examples of the reinforcing fiber forming the reinforcing fiber base material used in the production of the present prepreg can include carbon fibers, glass fibers, aramid fibers, silicon carbide fibers, polyester fibers, ceramic fibers, alumina fibers, boron fibers, metal fibers, mineral fibers, rock fibers, and slug fibers. Among these reinforcing fibers, carbon fibers, glass fibers, and aramid fibers are preferable, and carbon fibers which can provide a lightweight and high-strength fiber-reinforced composite material having good specific strength and specific elastic modulus are more preferable. Among carbon fibers, polyacrylonitrile (PAN)-based carbon fibers having excellent tensile strength are particularly preferable.

When a PAN-based carbon fiber is used as the reinforcing fiber, the tensile elastic modulus is preferably 170 to 600 GPa, particularly preferably 220 to 450 GPa. The tensile strength is preferably 3920 MPa (400 kgf/mm$^2$) or more. The use of such carbon fibers makes it possible to improve the mechanical properties of the obtained fiber-reinforced composite material.

The shape of the reinforcing fiber base material is not limited, but a sheet-shaped material is preferable from the viewpoint of processability. Examples of the reinforcing fiber sheet can include sheet-shaped materials in which a large number of reinforcing fibers are aligned in unidirection, bidirectional woven fabrics such as plain weave and twill weave, multi-axis woven fabrics, non-woven fabrics, mats, knits, braids, and papers made from reinforcing fibers. The thickness of the reinforcing fiber sheet is preferably 0.01 to 3 mm, more preferably 0.1 to 1.5 mm. The areal weight of the reinforcing fiber sheet is preferably 70 to 400 g/m$^2$, more preferably 100 to 300 g/m$^2$.

The content of the present thermosetting resin composition in the present prepreg is preferably 20 to 60% by mass, more preferably 30 to 50% by mass, based on the total mass of the reinforcing fiber base material and the present thermosetting resin composition. When the content of the present thermosetting resin composition is less than 20% by mass, voids or the like may be generated inside the fiber-reinforced composite material prepared by using this prepreg. When the content of the present thermosetting resin composition exceeds 60% by mass, the content of the reinforcing fibers is insufficient, and the strength of the obtained fiber-reinforced composite material tends to decrease.

The water absorption rate of the present prepreg is preferably 2 to 40%, more preferably 4 to 25*. In the present invention, the water absorption rate is an index showing the porosity in the prepreg, and the higher the water absorption rate, the higher the porosity in the prepreg. When the water absorption rate is high, there are many voids in the prepreg, which deteriorates the handleability during molding. In addition, since voids tend to remain in the produced fiber-reinforced composite material, the mechanical properties thereof may be adversely affected. When the water absorption rate is low, the drapeability is low because there are few voids in the prepreg. Therefore, good molding processability (shape followability) cannot be obtained.

(7) Method for Producing Prepreg

The present prepreg can be produced by impregnating the present thermosetting resin composition into the reinforcing fiber base material. As a method for impregnating the present thermosetting resin composition into the reinforcing fiber base material, a known wet method or dry method can be used. Since the wet method uses an organic solvent, it is necessary to remove an organic solvent after impregnation of the resin composition. Therefore, it is preferable to use the hot melt method, which is a dry method in which the organic solvent does not remain.

In the hot melt method, the present thermosetting resin composition and the stacked reinforcing fiber base material are heated under pressurization to reduce the viscosity of the present thermosetting resin composition, and the present thermosetting resin composition is impregnated into the reinforcing fiber base material. When the reinforcing fiber base material is a sheet-shaped material, it is preferable to stack the present thermosetting resin composition molded into a film on the reinforcing fiber base material.

The present thermosetting resin composition can be molded into a film by a known method. For example, the present thermosetting resin composition can be molded into a film by casting it on a support such as a release paper or a release film using a die coater, an applicator, a reverse roll coater, a comma coater, a knife coater, or the like. The temperature at which the film is produced is appropriately set according to the viscosity of the present thermosetting resin composition. Generally, the temperature is preferably 60 to 130° C., more preferably 80 to 110° C.

The thickness of the film of the present thermosetting resin composition is preferably generally 8 to 350 µm, more preferably 10 to 200 µm.

The pressurizing conditions when the present thermosetting resin composition is impregnated into the reinforcing fiber base material are appropriately adjusted according to the composition and viscosity of the present thermosetting resin composition. Usually, the linear pressure is 0.98 to 245 N/cm, more preferably 19.6 to 147 N/cm. When the linear pressure is less than 0.98 N/cm, it is difficult to sufficiently impregnate the resin composition into the reinforcing fiber sheet. Pressurization may be performed once or may be divided into a plurality of times.

The heating temperature when the present thermosetting resin composition is impregnated into the reinforcing fiber base material is appropriately adjusted according to the viscosity of the present thermosetting resin composition. It is usually 70 to 160° C., preferably 80 to 120° C. If the heating temperature is too low, the viscosity of the present thermosetting resin composition does not decrease, and it becomes difficult to impregnate the present thermosetting resin composition into the reinforcing fiber base material. If the heating temperature is too high, the curing reaction in the present thermosetting resin composition proceeds, and the tackiness and drapeability of the prepreg tend to deteriorate.

The industrial production rate of the prepreg is not particularly limited, but, in consideration of productivity and economic efficiency, is preferably 0.1 m/min or more, more preferably 1 to 50 m/min, particularly preferably 5 to 20 m/min in the case of continuous production.

(8) Method of Using the Present Prepreg

The present prepreg can be cured by a known method to prepare a fiber-reinforced composite material. Examples of a method for preparing a fiber-reinforced composite material using the present prepreg include conventionally known methods such as methods using manual lay-up, automatic tape lay-up (ATL), automatic fiber placement, vacuum bagging, autoclave cure, out of autoclave cure, fluid assisted processing, pressure assisted processes, matched mold processes, simple press cure, press-clave cure, or continuous band pressing.

For example, a molded fiber-reinforced composite material can be prepared by laminating the present prepregs, pressurizing them to 0.2 to 1 MPa in an autoclave, and heating them at 150 to 204° C. for 1 to 8 hours. The heat resistance can be further improved by treatment for 2 to 20 hours with gradual temperature increase in the temperature range of 180 to 280° C. as post-cure.

The present prepreg uses a highly heat-resistant resin composition. Therefore, the fiber-reinforced composite material prepared by using the present prepreg has heat resistance of at least 180° C. or higher. The cured resin composition forming the fiber-reinforced composite material preferably has a glass transition temperature of preferably 200 to 400° C., more preferably 250 to 350° C. obtained by a measurement method conforming to ASTM D7028.

The compression after impact (CAI) of the fiber-reinforced composite material prepared by using the present prepreg is 100 to 500 MPa, more preferably 150 to 400 MPa. The compression after impact (CAI) means compression after impact (CAI) which is compression after application of an impact of 30.5 J, which is obtained by a measurement method conforming to SACMA SRM 2R-94.

The resin flexural modulus of the resin used in the present prepreg is preferably 3.0 to 5.0 GPa, more preferably 3.5 to 4.5 GPa. The resin flexural modulus means a value obtained by a measurement method conforming to JIS K7171.

The resin flexural strength of the resin used in the present prepreg is preferably 30 to 300 MPa, more preferably 50 to 300 MPa. The resin flexural strength means a value obtained by a measurement method conforming to JIS K7171.

The resin flexural elongation of the resin used in the present prepreg is preferably 1 to 30%, more preferably 3 to 20%. The resin flexural elongation means a value obtained by a measurement method conforming to JIS K7171.

The prepreg has excellent storage stability, and maintains the molding processability immediately after the production even after at least 10 days have passed since the production of the prepreg. Therefore, even after a lapse of a predetermined time, a fiber-reinforced composite material having high heat resistance and impact resistance can be prepared.

Since the prepreg of the present invention has excellent adhesiveness to the metal material, a fiber-reinforced composite material which is adhered to the metal material can be obtained by curing the prepreg in a state where the prepreg of the present invention is adhered to the metal material to be adhered.

The prepreg of the present invention is also excellent in adhesiveness to a honeycomb core and the like, and is particularly excellent in adhesiveness to a metal honeycomb core. When the prepreg of the present invention is used, a part of the present thermosetting resin composition flows in along the wall surface of the honeycomb core to form a fillet on the wall surface portion of the honeycomb core and to adhere the fiber-reinforced composite material and the honeycomb to each other without using a film adhesive. The adhesive bonding strength between the prepreg of the present invention and the honeycomb core is preferably 2.5 MPa or more in the flatwise tensile test, as measured in the Examples which will be described later.

When the prepreg of the present invention is stacked on the metal material and cured to obtain a fiber-reinforced composite material adhered to the metal material, the film adhesive of the present invention may be further arranged between the prepreg and the metal material. The film adhesive of the present invention is used in combination, so that the fiber-reinforced composite material and the metal material can be adhered with higher adhesive strength. On the other hand, when the film adhesive is not used in combination, a lighter-weight complex can be obtained at a lower cost.

(9) Fiber-Reinforced Composite Material

A fiber-reinforced composite material can be obtained by integrating the present thermosetting resin composition and a reinforcing fiber base material made of a reinforcing fiber and curing the resultant composite. The method of integrating the present thermosetting resin composition with the reinforcing fiber base material is not particularly limited, and the reinforcing fiber base material and the present thermosetting resin composition may be composited in advance as is the case with the prepreg of the present invention. Further, for example, as in the resin transfer molding method (RTM method), the hand lay-up method, the filament winding method, and the pultrusion method, the reinforcing fiber base material and the present thermosetting resin composition may be composited at the time of molding.

As the reinforcing fiber base material used for the fiber-reinforced composite material, the above-mentioned reinforcing fiber base material can be used. The content of the present thermosetting resin composition in the fiber-reinforced composite material is preferably 10 to 80% by mass, more preferably 20 to 60% by mass, particularly preferably 30 to 50 by mass, based on the total mass of the reinforcing fiber base material and the thermosetting resin composition. If the content of the thermosetting resin composition is too small, voids or the like may be generated inside the fiber-reinforced composite material. If the content of the thermosetting resin composition is too large, the content of the reinforcing fibers is insufficient, and the strength of the obtained fiber-reinforced composite material tends to decrease.

(10) Method for Producing Fiber-Reinforced Composite Material

A fiber-reinforced composite material (FRP) can be obtained by integrating a reinforcing fiber base material and the present thermosetting resin composition and then heating and pressurizing the resultant under specific conditions to cure the resultant. Examples of the method for producing FRP using the prepreg of the present invention include known molding methods such as autoclave molding and press molding.

EXAMPLES

Hereinafter, the present invention will be described in more detail with reference to Examples. However, the present invention is not limited to the Examples which will be described below.

The following materials were used as raw materials for the thermosetting resin composition and the film adhesive.

[Aromatic Bismaleimide Compound]
  BMI1100-H: BMI-1100H (product name) (N,N'-4,4'-diphenylmethane bismaleimide, manufactured by Daiwa Kasei Industry Co., Ltd.)
  TDAB: Compimide TDAB (product name) (2,4-bismaleimide toluene, manufactured by Evonik Industries AG)
  [Aliphatic bismaleimide compound]
  BMI-TMH: BMI-TMH (product name) (1,6'-bismaleimide-(2,2,4-trimethyl)hexane, manufactured by Daiwa Kasei Industry Co., Ltd.)

[Co-Reactant]
  DABPA: DABPA (product name) (2,2'-diallyl bisphenol A, manufactured by Daiwa Kasei Industry Co., Ltd.)

[Soluble Thermoplastic Resin]
  PEI: Ultem1000-1000 (product name) crushed product (polyetherimide, manufactured by SABIC Innovative Plastics, average particle size: 15 μm)
  PES: SUMIKA EXCEL 5003P (product name) crushed product (polyether sulfone, manufactured by Sumitomo Chemical Co., Ltd., average particle size: 15 μm)

[Insoluble Thermoplastic Resin]
  AURUM: AURUM PD450M (product name) (polyimide, manufactured by Mitsui Chemicals, Inc.)

[Triazine Compound]
(Triazine Compound Having Diaminotriazine Structure)
  VD-3 (product name) (manufactured by Shikoku Chemicals Corporation), melting point: 160° C. (catalog value), which is a compound represented by the following chemical formula (12). In chemical formula (12), R is an aliphatic chain having 1 to 15 carbon atoms, and the present compound is a mixture thereof.

[Chemical Formula 12]

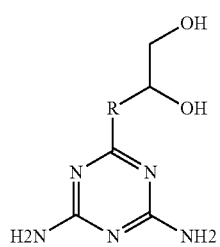

Chemical Formula (12)

VD-5 (product name) (manufactured by Shikoku Chemicals Corporation), melting point: 80° C. (catalog value), which is a compound represented by the following chemical formula (13). In chemical formula (13), R is an aliphatic chain having 1 to 15 carbon atoms, and the present compound is a mixture thereof.

[Chemical Formula 13]

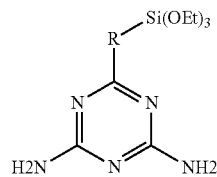

Chemical Formula (13)

VD-HT (product name) (manufactured by Shikoku Chemicals Corporation), melting point: 220° C. (catalog value), which is a compound represented by the following chemical formula (14). In chemical formula (14), R is an aliphatic chain having 1 to 15 carbon atoms, and the present compound is a mixture thereof.

[Chemical Formula 14]

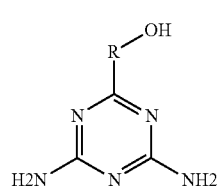

Chemical Formula (14)

(Other Triazine Compounds)
  D3265 (product name) (manufactured by Tokyo Chemical Industry Co., Ltd.), melting point: 140° C. (catalog value), which is a compound represented by the following chemical formula (20).

[Chemical Formula 20]

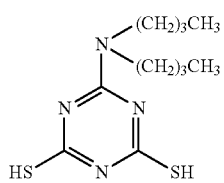

Chemical Formula (20)

[Base Material Fiber]
  Base material A: E10 T 4W 106T (product name) (glass fiber woven fabric, manufactured by Unitika Glass Fiber Co., Ltd., areal weight: 106 g/m$^2$)
  Base material B: H25X104 (product name) (glass fiber woven fabric, manufactured by Unitika Glass Fiber Co., Ltd., areal weight: 24.5 g/m$^2$)

[Carbon Fiber Base Material]
  Base material C: Sheet-shaped reinforcing fiber base material prepared by aligning carbon fibers of carbon fiber strand Tenax (registered trademark) IMS 65E 23 24K 830 tex (manufactured by Teijin Limited, tensile strength: 5800 MPa, tensile modulus: 290 GPa) in one direction so that the fiber areal weight is 190 g/m$^2$.
  Base material D: Tenax (registered trademark) W3101 (carbon fiber woven fabric, manufactured by Teijin Limited, areal weight: 200 g/m$^2$)

The thermosetting resin composition, the film adhesive, and the prepreg were evaluated by the following methods.

[Flatwise Tensile Test]

A honeycomb core laminate was obtained by laminating laminates, in which five sheets of BMI prepreg and film adhesive were laminated in directions of [45°/−45°/0°/90°/film adhesive], above and below a honeycomb core. In the flatwise tensile test on the prepreg, a honeycomb core laminate was obtained by laminating laminates, in which four sheets of the prepreg were laminated in directions of [45°/−45°/0°/90° ] without using the film adhesive, above and below the honeycomb core. The honeycomb core used at this time was AL3/16-5052-0.002N manufactured by Showa Aircraft Industry Co., Ltd. This laminate was put in a bag, and temperature-increased in an autoclave at 1.7° C./min, heated at 180° C. for 360 minutes, cured, and further post-cured at 240° C. for 360 minutes to obtain a honeycomb sandwich panel.

A test piece was cut out from the obtained honeycomb sandwich panel to a length of 50.8 mm and a width of 50.8 mm, and an aluminum block having a length of 50.8 mm and a width of 50.8 mm was adhered to the upper and lower surfaces of the test piece with an epoxy adhesive. After the adhesive was cured, a tensile test was conducted in the vertical direction (thickness direction) of the honeycomb sandwich panel in accordance with ASTM C 273 at a tensile speed of 0.5 mm/min, to measure the flatwise strength of the honeycomb sandwich panel.

[Lap Shear Tensile Test]

An aluminum plate (grade: 2024-T3) was cut to a width of 25.4 mm and a length of 101.6 mm, and blasted 12.7 mm from an end. A film adhesive was attached to the blasted portion, and a 12.7 mm-blasted aluminum plate was also layered on the upper surface. This laminate was put in a bag, temperature-increased in an autoclave at 2° C./min, heated at 180° C. for 360 minutes, cured, and post-cured at 240° C. for 360 minutes to obtain a flatwise test piece. A tensile test was conducted in accordance with ASTM D 1002 to measure a lap shear tensile strength of the film adhesive.

[Tackiness]

At the time of hand lay-up, the ease of lamination was evaluated.

Those which were sufficiently tacky and did not peel off even after lamination were evaluated as o;

those which were weakly tacky and could be confirmed to peel off at an end part and the like after lamination were evaluated as Δ; and those which were very weakly tacky and difficult to laminate at ordinary temperature were evaluated as x.

[Compression after Impact (CAI)]

The prepreg was cut into a square with each side of 360 mm and laminated to obtain a laminate with a laminated structure [+45/0/−45/90]$_{3s}$. A normal vacuum autoclave molding method was used to perform molding under a pressure of 0.59 MPa and under the condition of 180° C. for 6 hours. The obtained molded product was taken out and post-cured on a free stand under the condition of 240° C. for 6 hours using a hot air circulation dryer. The molded product was cut to a size of 101.6 mm in width×152.4 mm in length to obtain a test piece for a compression after impact (CAI) test. Using this test piece, an impact of 30.5 J was applied to damage the test piece, and, thereafter, the damaged area and compressive strength (CAI) were measured in accordance with SACMA SRM 2R-94. The crosshead speed of the test piece compression tester was 1.27 mm/min, and the measurement was performed at n=5.

Examples 1 to 15 and Comparative Examples 1 to 6

[Preparation of Thermosetting Resin Composition]

The respective components were mixed at 85° C. with the formulation shown in Table 1 to prepare a thermosetting resin composition.

Examples 1 to 13 and Comparative Examples 1 to 4

[Preparation of Film Adhesive]

Each thermosetting resin composition was impregnated into the base material fiber to obtain a film adhesive. The heating temperature at this time was 50° C. The tackiness was evaluated using this film adhesive. The results are shown in Table 1.

A flatwise tensile test and a lap shear tensile test were conducted on each of the prepared film adhesives. The results are shown in Table 1.

Example 14

A prepreg was prepared by the following method using the thermosetting resin composition obtained in Example 2 and the base material C as the carbon fiber base material. Flatwise and tackiness were evaluated using the obtained prepreg. The results are shown in Table 2. In the flatwise test, a honeycomb sandwich panel obtained by laminating laminates, in which four sheets of the obtained prepreg were laminated in directions of (45°/−45°/0°/90°) without using a film adhesive, above and below the honeycomb core and curing the honeycomb core laminate was used for evaluation. The prepreg obtained in Example 14 exhibited sufficiently high flatwise properties even without using the film adhesive.

[Preparation of Prepreg]

A thermosetting resin composition was applied onto a release paper using a reverse roll coater to prepare a resin film having a areal weight of 50 g/m$^2$. Next, the obtained resin films were stacked on both sides of the carbon fiber base material, and heated and pressurized under the conditions of a temperature of 100° C. and a pressure of 0.2 MPa to prepare a prepreg having a carbon fiber content of 65% by mass.

Example 15

A prepreg was prepared in the same manner as in Example 14 except that the base material D was used as the carbon fiber base material. Flatwise and tackiness were evaluated using the obtained prepreg. The results are shown in Table 2. The prepreg obtained in Example 14 exhibited sufficiently high flatwise properties even without using the film adhesive.

Comparative Example 5

A prepreg was prepared in the same manner as in Example 14 except that the resin composition obtained in Comparative Example 1 was used as the thermosetting resin composition. The tackiness was evaluated using the obtained prepreg. The results are shown in Table 2. The prepreg obtained in Comparative Example 5, which contained no triazine compound, had inadequate flatwise properties.

Comparative Example 6

A prepreg was prepared in the same manner as in Comparative Example 5 except that the base material D was used as the carbon fiber base material. The tackiness was evaluated using the obtained prepreg. The results are shown in Table 2. The prepreg obtained in Comparative Example 6, which contained no triazine compound, had inadequate flatwise properties.

TABLE 1

|  |  |  | Comparative Example 1 | Comparative Example 2 | Example 1 | Example 2 | Example 3 |
|---|---|---|---|---|---|---|---|
| Resin composition (parts by mass) | Bismaleimide compound | BMI-TMH | 11.2 | 11.2 | 11.2 | 11.2 | 11.2 |
|  |  | TDAB | 20.0 | 20.0 | 20.0 | 20.0 | 20.0 |
|  |  | BMI1100-H | 30.6 | 30.6 | 30.6 | 30.6 | 30.6 |
|  | Co-reactant | DABPA | 38.2 | 38.2 | 38.2 | 38.2 | 38.2 |
|  | Soluble thermoplastic resin | PEI | 4.3 | 4.3 | 4.3 | 4.3 | 4.3 |
|  |  | PES | — | — | — | — | — |
|  | Insoluble thermoplastic resin | AURUM | 18.4 | 18.4 | 18.4 | 18.4 | 18.4 |
|  | Diaminotriazine compound | VD-3 | — | — | 0.5 | 3 | 5 |
|  |  | VD-5 | — | — | — | — | — |
|  |  | VD-HT | — | — | — | — | — |
|  | Other triazine compounds | D3265 | — | 3 | — | — | — |
| Base material fiber |  |  | Base material A | Base material A | Base material A | Base material A | Base material A |
| Basis weight of film adhesive (g/m$^2$) |  |  | 391 | 391 | 391 | 391 | 391 |
| Flatwise (MPa) |  |  | 3.50 | 3.43 | 3.7 | 4.03 | 4.1 |
| Lap shear (MPa) |  |  | — | — | — | — | — |
| Tackiness |  |  | ○ | ○ | ○ | ○ | ○ |

|  |  |  | Example 4 | Example 5 | Example 6 |
|---|---|---|---|---|---|
| Resin composition (parts by mass) | Bismaleimide compound | BMI-TMH | 11.2 | 11.2 | 11.2 |
|  |  | TDAB | 20.0 | 20.0 | 20.0 |
|  |  | BMI1100-H | 30.6 | 30.6 | 30.6 |
|  | Co-reactant | DABPA | 38.2 | 38.2 | 38.2 |
|  | Soluble thermoplastic resin | PEI | 4.3 | 4.3 | 4.3 |
|  |  | PES | — | — | — |
|  | Insoluble thermoplastic resin | AURUM | 18.4 | 18.4 | 18.4 |
|  | Diaminotriazine compound | VD-3 | 10 | — | — |
|  |  | VD-5 | — | 3 | — |
|  |  | VD-HT | — | — | 3 |
|  | Other triazine compounds | D3265 | — | — | — |
| Base material fiber |  |  | Base material A | Base material A | Base material A |
| Basis weight of film adhesive (g/m$^2$) |  |  | 391 | 391 | 391 |
| Flatwise (MPa) |  |  | 4.05 | 3.7 | 3.9 |
| Lap shear (MPa) |  |  | — | — | — |
| Tackiness |  |  | Δ | ○ | ○ |

TABLE 2

|  |  |  | Example 7 | Example 8 | Example 9 | Comp. Example 3 | Example 10 |
|---|---|---|---|---|---|---|---|
| Resin composition (parts by mass) | Bismaleimide compound | BMI-TMH | 11.2 | 11.2 | 11.2 | 11.2 | 11.2 |
|  |  | TDAB | 20.0 | 20.0 | 20.0 | 20.0 | 20.0 |
|  |  | BMI1100-H | 30.6 | 30.6 | 30.6 | 30.6 | 30.6 |
|  | Co-reactant | DABPA | 38.2 | 38.2 | 38.2 | 38.2 | 38.2 |
|  | Soluble thermoplastic resin | PEI | 4.3 | 4.3 | 4.3 | 4.3 | 4.3 |
|  |  | PES | 30.8 | 32 | — | — | — |
|  | Insoluble thermoplastic resin | AURUM | 18.4 | 18.4 | 18.4 | 18.4 | 18.4 |
|  | Diaminotriazine compound | VD-3 | 0.5 | 5 | 3 | — | 3 |
|  |  | VD-5 | — | — | — | — | — |
|  |  | VD-HT | — | — | — | — | — |
|  | Other triazine compounds | D3265 | — | — | — | — | — |

TABLE 2-continued

| Base material fiber | | | Base material A | Base material A | Base material A | Base material A | Base material A |
|---|---|---|---|---|---|---|---|
| Basis weight of film adhesive (g/ms²) | | | 391 | 391 | 146 | 293 | 293 |
| Flatwise (MPa) | | | 4.5 | 5.32 | — | — | — |
| Lap shear (MPa) | | | — | — | 19 | 11 | 18 |
| Tackiness | | | ○ | ○ | ○ | ○ | ○ |

| | | | Example 11 | Comp. Example 4 | Example 12 | Example 13 |
|---|---|---|---|---|---|---|
| Resin composition (parts by mass) | Bismaleimide compound | BMI-TMH | 11.2 | 11.2 | 11.2 | 11.2 |
| | | TDAB | 20.0 | 20.0 | 20.0 | 20.0 |
| | | BMI1100-H | 30.6 | 30.6 | 30.6 | 30.6 |
| | Co-reactant | DABPA | 38.2 | 38.2 | 38.2 | 38.2 |
| | Soluble thermoplastic resin | PEI | 4.3 | 4.3 | 4.3 | 4.3 |
| | | PES | — | — | — | — |
| | Insoluble thermoplastic resin | AURUM | 18.4 | 18.4 | 18.4 | 18.4 |
| | Diaminotriazine compound | VD-3 | 3 | — | — | — |
| | | VD-5 | — | — | 3.0 | — |
| | | VD-HT | — | — | — | 3.3 |
| | Other triazine compounds | D3265 | — | 3.0 | — | — |
| Base material fiber | | | Base material A | Base material A | Base material A | Base material A |
| Basis weight of film adhesive (g/ms²) | | | 488 | 293 | 293 | 293 |
| Flatwise (MPa) | | | — | — | — | — |
| Lap shear (MPa) | | | 17 | 10 | 17 | 18 |
| Tackiness | | | ○ | ○ | ○ | ○ |

TABLE 3

| | | | Comp. Example 5 | Example 14 | Comp. Example 6 | Example 15 |
|---|---|---|---|---|---|---|
| Resin composition (parts by mass) | Bismaleimide compound | BMI-TMH | 11.2 | 11.2 | 11.2 | 11.2 |
| | | TDAB | 20.0 | 20.0 | 20.0 | 20.0 |
| | | BMI1100-H | 30.6 | 30.6 | 30.6 | 30.6 |
| | Co-reactant | DABPA | 38.2 | 38.2 | 38.2 | 38.2 |
| | Soluble thermoplastic resin | PEI | 4.3 | 4.3 | 4.3 | 4.3 |
| | | PES | — | — | — | — |
| | Insoluble thermoplastic resin | AURUM | 18.4 | 18.4 | 18.4 | 18.4 |
| | Diaminotriazine compound | VD-3 | — | 3 | — | 3 |
| | | VD-5 | — | — | — | — |
| | | VD-HT | — | — | — | — |
| | Other triazine compounds | D3265 | — | — | — | — |
| Base material fiber | | | Base material C | Base material C | Base material D | Base material D |
| Basis weight of film adhesive (g/m²) | | | 0 | 0 | 0 | 0 |
| Flatwise (MPa) | | | 2.1 | 2.5 | 2.2 | 2.6 |
| CAI (MPa) | | | 228 | 230 | 214 | 214 |
| Tackiness | | | ○ | ○ | ○ | ○ |

The invention claimed is:

1. A thermosetting resin composition comprising a bismaleimide compound and a triazine compound,
wherein the triazine compound is selected from the following chemical formulas (12) to (14):

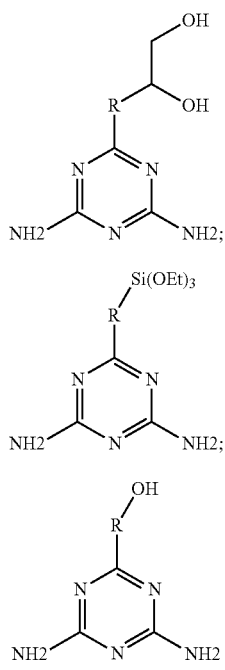

Chemical Formula (12)

Chemical Formula (13)

Chemical Formula (14)

wherein in each of chemical formulas (12), (13), and (14), R is an aliphatic chain having 1 to 15 carbon atoms.

2. The thermosetting resin composition according to claim 1, wherein the thermosetting resin composition comprises 0.1 to 30 parts by mass of the triazine compound based on 100 parts by mass of the bismaleimide compound.

3. The thermosetting resin composition according to claim 1, wherein the thermosetting resin composition further comprises a thermoplastic resin.

4. A film adhesive comprising: a base material fiber; and a thermosetting resin composition according to claim 1.

5. The film adhesive according to claim 4, wherein the thermosetting resin composition comprises 0.1 to 30 parts by mass of the triazine compound based on 100 parts by mass of the bismaleimide compound.

6. The film adhesive according to claim 4, wherein the thermosetting resin composition further comprises a thermoplastic resin.

7. The film adhesive according to claim 4, wherein the base material fiber is a glass fiber or a carbon fiber.

8. The film adhesive according to claim 4, which has a areal weight of 50 to 1500 $g/m^2$.

9. A method for producing the film adhesive according to claim 4, comprising integrating the base material fiber and the thermosetting resin composition.

10. The method for producing the film adhesive according to claim 9, wherein the integration is impregnation of the thermosetting resin composition into the base material fiber.

11. A prepreg comprising: a reinforcing fiber; and a thermosetting resin composition according to claim 1 impregnated into a reinforcing fiber layer made of the reinforcing fiber, the thermosetting resin composition comprising: a bismaleimide compound and a triazine compound having a diaminotriazine structure.

12. The prepreg according to claim 11, wherein the thermosetting resin composition comprises 0.1 to 30 parts by mass of the triazine compound based on 100 parts by mass of the bismaleimide compound.

13. The prepreg according to claim 11, wherein the thermosetting resin composition further comprises a thermoplastic resin.

14. The prepreg according to claim 11, wherein the reinforcing fiber is a carbon fiber.

15. A method for producing a prepreg, comprising integrating a reinforcing fiber and the thermosetting resin composition according to claim 1.

* * * * *